(12) United States Patent
Zhang et al.

(10) Patent No.: US 6,879,561 B1
(45) Date of Patent: Apr. 12, 2005

(54) METHOD AND SYSTEM FOR WIRELESS PACKET SCHEDULING WITH PER PACKET QOS SUPPORT AND LINK ADAPTATION

(75) Inventors: Hang Zhang, Ottawa (CA); Peiying Zhu, Kanata (CA); Shalini S. Periyalwar, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 695 days.

(21) Appl. No.: 09/704,684

(22) Filed: Nov. 3, 2000

(51) Int. Cl.[7] ............................................... H04L 1/00
(52) U.S. Cl. ................. 370/235; 370/395.21; 370/395.4
(58) Field of Search .............................. 370/235–236, 370/395.21, 395.4, 229–231, 252, 278, 389, 395.1, 395.41, 395.42, 395.43, 395.5, 395.52, 395.2

(56) References Cited

U.S. PATENT DOCUMENTS 5,684,791 A * 11/1997 Raychaudhuri et al. .. 370/310.2
6,493,331 B1 * 12/2002 Walton et al. ............... 370/341
6,532,213 B1 * 3/2003 Chiussi et al. ........... 370/230.1
6,594,238 B1 * 7/2003 Wallentin et al. ........... 370/252
6,657,987 B1 * 12/2003 Kumar et al. ............... 370/346

* cited by examiner

*Primary Examiner*—Man U. Phan
*Assistant Examiner*—Toan Nguyen
(74) *Attorney, Agent, or Firm*—L. Anne Kinsman; Borden Ladner Gervais LLP

(57) ABSTRACT

A method and system for scheduling data in the down, or forward, link, on a per packet basis in a wireless telecommunications network. The scheduler determines the order of packets to be sent from multiple queues based on per IP QoS, real time channel condition and real time buffer occupancy. The scheduler determines the necessary support link adaptation on a per packet basis based on per packet QoS and the channel condition. The scheduling system and method take into consideration both upper layer per packet QoS, for example packet delay bound, and the real time channel condition (C/I) for each mobile terminal. The method of the present invention also determines the layer 2 frame length for each scheduled packet.

2 Claims, 4 Drawing Sheets

METHOD AND SYSTEM FOR WIRELESS PACKET SCHEDULING WITH PER PACKET QOS SUPPORT AND LINK ADAPTATION

FIELD OF THE INVENTION

The present invention relates to packet scheduling in a telecommunications network. In particular, the present invention relates to a method and system for scheduling packets in a wireless telecommunications system.

BACKGROUND OF THE INVENTION

The design of current third generation (3G), and enhanced 3G, wireless access networks is driven by the need for high speed internet access. Increasingly, consumers are moving to wireless communications for the delivery of services and applications using conventional TCP/IP (Transmission Control Protocol/Internet Protocol). This trend is growing with the increase in internet-enabled wireless devices available to users, including cellular telephones, Personal Digital Assistants (PDAs), and other devices. The applications that are not available or contemplated for wireless devices include access to the World Wide Web, video telephony, voice over IP, e-mail, etc.

However, wireless networks, whether fixed or mobile, suffer certain disadvantages over their wired counterparts in the delivery of IP applications. This is mainly due to the significantly greater lost or dropped packets in wireless networks, as compared to wireline. Such losses can be largely attributed to the changeable quality of the channel over which IP packets are sent. The wireless channel condition is highly dependent on the location of the wireless terminal in relation to its base station, and extraneous external or atmospheric interference. The combination of these factors can have a significant effect on the delivery of data services over wireless channels.

A further complication in wireless communication networks is caused by channels that are shared among multiple users. The high burstiness of packet-based applications requires statistical multiplexing on the forward link for increased system capacity and throughput on such channels.

A forward link packet scheduler is required to manage the output queues to provide the desired forwarding of packets to users in a wireless network. Generally, a forward link scheduler performs two main functions. It makes scheduling decisions, using a scheduling algorithm, to determine which users' queued traffic should be scheduled for each transmission slot, and decides the link layer (layer 2) frame length/size (i.e., how many bits of data) of the selected user's traffic can be sent in each slot.

Current wireless packet schedulers have a very limited capability for handling Quality of Service (QoS) at a per application or service level, and are completely unable to support QoS at a per packet level. In terms of scheduling algorithms, current schedulers, such as those developed under the edma2000 1xRTT standard and the Universal Mobile Telecommunications System (UMTS), are purely driven by latency of traffic to users, or, in the case of High Data Rate (HDR), are driven by channel condition with fairness consideration. These algorithms do not consider per packet Quality of Service (QoS). In terms of determining the layer 2 frame length/size, current systems determine the layer 2 frame length either by fixed physical layer frame structure (e.g., 1xRTT, UMTS), or by link adaptation which considers both physical layer frame structure and channel condition (e.g., HDR, and Enhanced Data Rates for GSM Evolution (EDGE)). In addition, current schedulers are unable to provide a tight match between per IP QoS and resource allocation, are unable to support multiplexing on a packet basis, and are unable to support per packet based Automatic Repeat reQuests (ARQs). These existing wireless packet schedulers do not take into consideration both per packet QoS and link adaptation.

It is, therefore, desirable to provide a scheduler that can support per packet QoS, can support link adaptation on a per packet basis, can support packet-based multiplexing, and can support per packet-based ARQs.

SUMMARY OF THE INVENTION

It is an object of the present invention to obviate or mitigate at least one disadvantage of previous systems and methods for wireless packet scheduling. In particular, it is an object of the present invention to provide a system and method that permits scheduling on a per packet basis, and that permits packet multiplexing in a single frame or slot.

In a first aspect, the present invention provides a method for scheduling packets for transmission over a forward link in a wireless communication system. The method consists of determining a wireless quality of service condition, or per packet QoS, for each of a plurality of packets awaiting transmission to a terminal. For each available frame, a reported channel condition for a forward link from the terminal is received. From the reported channel condition, a link mode for transmission to the terminal can be determined. Then, each of the plurality of packets is scheduled in order of its respective wireless quality of service condition, and at the determined link mode, for transmission in a physical layer frame.

In presently preferred embodiments, the quality of service condition is stored as a packet tag associated with each of the plurality of packets. The packet tag includes a start time and a finish time that are functions of a packet delay bound, an arrive time and a delay budget for each packet. A deadline for each packet can then be calculated as a function of the start time and a current system time.

Typically, the method of the present invention assumes that there are also further packets that are awaiting transmission to other terminals. Generally, packets are scheduled in order of their deadlines, their wireless quality of service conditions, the channel condition for the terminal to which they are to be sent, or a combination of these factors as determined by the operator of the wireless access network.

In a further aspect, the present invention provides a scheduler for scheduling packets for forward link transmission in a wireless communication network. The scheduler consists of a packet tag computation unit for determining a wireless quality of service condition for each of a plurality of packets awaiting transmission to a terminal, and a link mode determination unit for receiving a reported channel condition for a forward link from the terminal, and for determining a link mode for transmission to the terminal according to the reported channel condition. A scheduling unit then schedules each of the plurality of packets in order of its respective quality of service condition, and at the determined link mode, for transmission in a physical layer frame.

In yet a further aspect, there is provided a wireless access network. The wireless access network includes a radio transceiver for sending a physical layer frame to a terminal. The frame is assembled by the above-described scheduler.

BRIEF DESCRIPTION OF THE DRAWINGS

Embodiments of the present invention will now be described, by way of example only, with reference to the attached figures, wherein.

DETAILED DESCRIPTION

Generally, the present invention is a method and system for scheduling data in the down, or forward, link, on a per packet basis in a wireless telecommunications network. A wireless packet scheduler is presented that can determine the order of packets to be sent from multiple queues based on per packet QoS, real time channel condition an/or real time buffer occupancy. The scheduler can also determine the necessary support link adaptation on a per packet basis based on per packet QoS and the channel condition. The scheduling system and method can take into consideration both upper layer per packet QoS, such as packet delay bound, and the real time channel conditions (e.g., C/I) for each mobile terminal. The method of the present invention can also determine the layer 2 frame length for each scheduled packet.

As used herein, link adaptation is a protocol whereby the physical layer link modulation and code rate are dynamically changed based on current channel condition for each mobile, in order to satisfy a required wireless link QoS, such as frame error rate (FER), bit error rate (BER) or block error rate (BLER), and to maximize data throughput.

Figure 1:
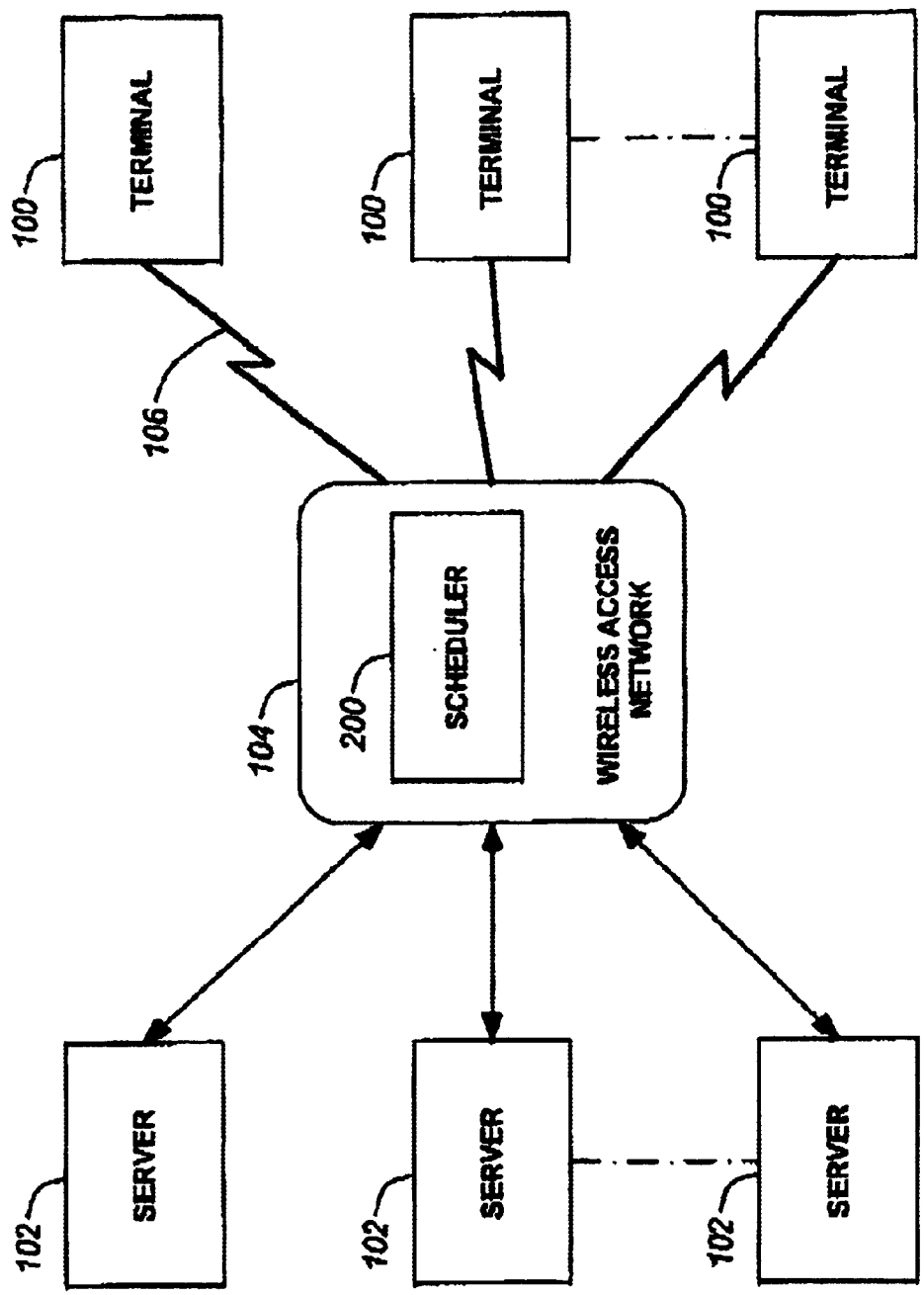
FIG. 1 is a diagram of a wireless network configuration for communication between a wireless terminal and an application server.

FIG. 1 shows a typical wireless network configuration linking a number of wireless terminals 100 to a number of servers 102 through a wireless access network 104. As will be understood by those of skill in the art, FIG. 1 is a simplified overview of a wireless network configuration. Typically, a server 102, or terminal 100 in the case of terminal—terminal communications, sends data to the wireless access network 104 from which the data is transmitted over a radio link 106 to a terminal 100. Wireless access network 104 typically includes one or more base stations, or hubs, including suitable processing means and radio frequency hardware, as is well known to those of skill in the art. A wireless packet scheduler 200 is included in the wireless access network 104, in the data link layer, to schedule the transmission of data packets to appropriate terminals 100.

The system and method of the present invention presume that the network is packet-based, such as TCP/IP-based. As used herein, a terminal can be any suitable wireless device, such as a cellular telephone or wireless access protocol (WAP) enabled device capable of executing real time applications, such as video conferencing and voice over IP, and/or non-real time applications, such as a file transfer or e-mail. The applications provided by application servers 102 can, if desired, support multiple users simultaneously, and multiple applications can be supported for each user.

The payload data is provided to the link layer by the application layer. It is assumed that the packets so received include information relating to their per packet QoS. The per packet QoS can be based on, for example, each packet's acceptable packet loss rate, packet delay bound and/or other parameters. As used herein, packet delay bound is the acceptable delay in the wireless link for a given packet. For example, real time packets could have a packet delay bound of 70 ms, while non-real time packets could have a packet delay bound of up to 3 s. In such an example, a higher priority, or QoS, would be given to packets from real time applications than to packets from non-real time applications if the per packet QoS was based on packet delay bound.

Figure 2:
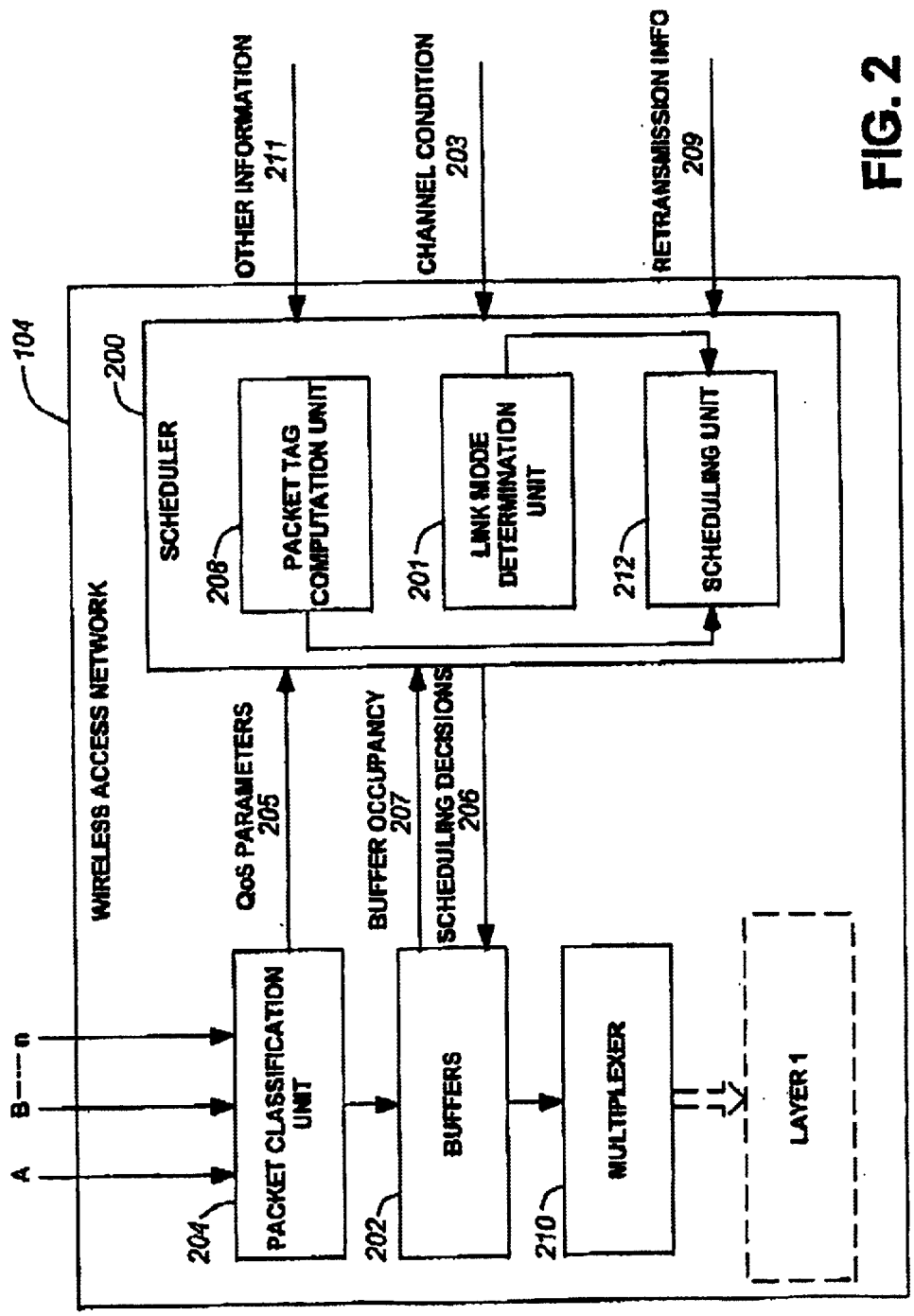
FIG. 2 is a diagram of the scheduler function of an embodiment of the system of the present invention.

FIG. 2 is a block diagram of the wireless access network 104, including the scheduler 200 of the present invention. Data packets are received from the application layer for a number of users A, B to n. The packets are received by a packet classification unit 204 from the application layer, and include appropriate per packet QoS information. The packet classification unit 204 classifies each packet according to its respective per packet QoS information, and passes a packet classification, or per packet QoS parameters, 205 to a packet tag computation unit 208 in the scheduler 200, which associates an appropriate packet tag to each incoming packet. The QoS parameters 205 include the per packet QoS, the packet delay bound, and the packet arrive time in the queue. The packet tag, also referred to herein as the wireless quality of service condition, includes the per packet (or wireless) QoS parameters 205 for the packet, as well as the packet's start time and a finish time. The start time and finish time are derived from the arrive time of the packet, the packet delay bound, and any delay budget (e.g., delay budget for retransmission or delay budget for fragmentation) for the packet. Meanwhile, the incoming packets are stored in buffer(s) 202 while they await transmission. Typically, one queue is set up for each user or terminal. Alternatively, queues can be determined according to per packet QoS, or other factors. The scheduler 200 receives channel condition information 203 from each terminal, for each frame or slot. The channel condition information 203 is used by a link mode determination unit 201 to determine an appropriate link mode for each channel.

The packet tag, channel condition information 203, buffer occupancy information 207 from the buffers 202, retransmission information 209 and other information 211, such as the packet loss rate, are supplied to a scheduling unit 212 that applies a scheduling algorithm, or set of scheduling rules, to provide scheduling decisions 206 that are returned to the buffers 202 to schedule the packets. The scheduling unit 212 determines a deadline for each packet, and schedules the packets according to their deadlines, finish times, per packet QoS, and/or other factors, as determined by the scheduling algorithm. The deadline is be derived from the packet's start time and the current system time (the computation of packet deadlines is discussed in greater detail below). As used herein, "scheduling" includes both selecting and ordering packets for transmission, allocating them to a layer 2 (L2) frame, and specifying a link mode for each channel. The assembly of the scheduled packets is effected by multiplexer 210 before being sent to the physical layer (layer 1) for transmission.

As with conventional schedulers, the scheduler 200 performs on a per slot basis. The link mode for each channel, as determined by link mode determination unit 201, is typically found by lookup in a predetermined table according to the reported channel condition for each terminal.

Generally, the scheduling method of the present invention is as follows. Upon arrival at the scheduler 200, each packet is labelled by a tag provided by the packet tag computation unit 208. For example, the tag can include a start time and a finish time that are functions of the packet delay bound, packet length, and/or other parameters of the per packet QoS. For each slot, the scheduler 200 then decides which packets should be scheduled first based on a deadline that is derived from the packet tag and the current system time. Those packets that must be sent in the current frame are first identified. The packets that must be sent in the current frame include, for example, those where the finish time is equal to the current system time, and those where the deadline is zero. The scheduler 200 also determines the link mode for each identified packet based on the channel condition for transmitting each identified packet. This determines the L2 frame size for each identified packet. If there are resources left after these packets are scheduled for the current slot, the scheduler 200 can then repeat the above steps for unscheduled packets according to their wireless quality of service conditions, or for packets with the best available channel condition, in accordance with the scheduler algorithm, until the slot or frame is filled. The information used by the scheduler 200 generally includes the channel condition of each user or terminal, any retransmission information, the wireless packet QoS conditions, and the packet sizes. This process is repeated at each slot for packets that remain in the queues, and for new packets that have arrived in the queues.

For example, the packet tag can be determined as follows. The kth packet in ith queue is $P_{i,k}$. Its arrive time $t_{i,k}^a$ is the system time when the packet enters a queue. The finish time $t_{i,k}^f$ is $t_{i,k}^a+D$, where D is the packet delay bound; and, the start time $t_{i,k}^s$ is $t_{i,k}^f-D_{i,k}^{ret}-D_{i,k}^{freq}$, where $D_{i,k}^{ret}$ is the estimated delay budget for retransmission for packets that can be retransmitted (i.e. non-real time packets), and $D_{i,k}^{frag}$ is the estimated delay budget for fragmentation, if fragmentation is supported. The packet deadline $t_{i,k}^d$ is equal to the current system time t minus the start time $t_{i,k}^s$.

In a first example of the method of the present invention, the scheduling is primarily deadline driven. The packet with the minimum deadline $t_{i,k}^d$ as determined by its start time among all queues is selected first. The channel condition for a particular user is used to determine the physical layer link modulation and code rate for the packets sent to that user. If any resources are left after the first packet is scheduled, the scheduler 200 continues to schedule packets based on the packet deadlines until an L2 frame is filled.

In a second example of the method of the present invention, the scheduling is both deadline and per packet QoS driven. The rules are as above for the first method, however, packets can have either a per packet QoS of Q1 or Q2. To meet the per packet QoS and to resolve conflicts between packets, the following additional rules are added. Q1 packets have a higher priority than Q2 packets (for example, Q1 packets are real time packets, and Q2 packets are non-real time packets). Therefore, when both a Q1 packet and a Q2 packet have the same minimum deadline, the Q1 packet has priority over the Q2 packet. If there is a conflict between Q1 packets, a Q1 packet is randomly selected. If there is a conflict between Q2 packets, a Q2 packet is randomly selected. If a packet's deadline $t_{i,k}^d$ less than or equal to zero, it must be sent in the current frame, provided its finish time $t_{i,k}^f$ is greater than or equal to the current system time t. If the finish time $t_{i,k}^f$ is less than the current system time t, the packet is dropped.

Figure 3:
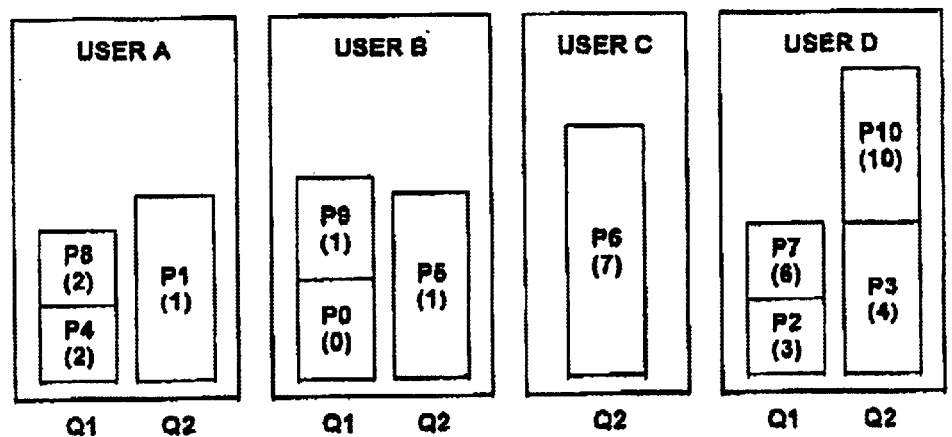
FIG. 3 shows queued packets for four users according to an example of the method of the present invention.
Figure 4:
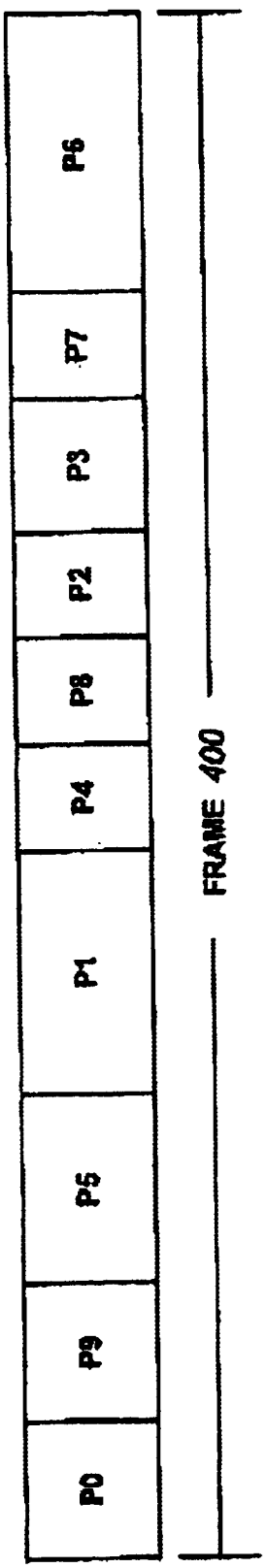
FIG. 4 shows the scheduling of the packets in FIG. 3.

An illustration of the operation of the scheduler using the scheduling algorithm of this second example is illustrated in FIGS. 3 and 4. FIG. 3 shows a number of packets that are queued for transmission. Packets for four users: User A, User B, User C and User D are shown. User A has three packets queued: packet P1 is a Q2 packet, packets P8 and P4 are Q1 packets. User B also has three queued packets: packets P9 and P0 are Q1 packets, and packet P5 is a Q2 packet. User C has a Q2 packet P6 waiting for transmission, and User D has four packets: packets P7 and P2 which are Q1 packets, and packets P10 and P3 which are Q2 packets. For the purposes of this example, it is assumed that the channel condition for each user is the same, and, therefore, that each user has the same link adaptation rate.

Packet P0 has a deadline $t_{i,k}^d=0$, and is the first to be allocated to L2 frame 400, as shown in FIG. 4. Packets P1, P9, and P5 all have deadlines of "1". However, packet P9 is a Q1 packet, while packets P1 and P5 are Q2 packets. Therefore, packet P9 is next scheduled. A random selection is then made between packets P5 and P1, and packet P5 is scheduled, followed by packet P1. Packets P4 and P8 each have deadlines of "2", and are both Q1 packets. Random selection between them leads to packet P4 being scheduled before packet P8. Packets P2, P3, P7, and P6 are then scheduled based on their deadlines such that frame 400 is filled. The remaining packet P10 remains in User D's queue for scheduling in the next frame. As an alternative to random selection among packets having equal QoS and deadlines, the scheduler 200 can choose those packets that are for the same User, as opposed to packets for Users who do not have a currently scheduled packet. This can reduce overhead by reducing the number of headers required, since a single user's packets can be sent in series.

In a further example of a scheduling algorithm according to the present invention both packet deadlines and channel condition are taken into consideration to determine the scheduling. The channel condition is also used to determine the link adaptation for each user's packets. First, all packets with a deadline $t_{i,k}^d=0$ are scheduled. The packet destined to the user with the best relative channel condition is scheduled first, followed by that with the next best condition, etc. If further space remains in the frame, the user with the best channel condition is next selected. All available packets for this user are scheduled, followed by the packets for the user with the next best channel condition, etc. Otherwise, the conflict resolution rules are as outlined above for the second example.

Figure 5:
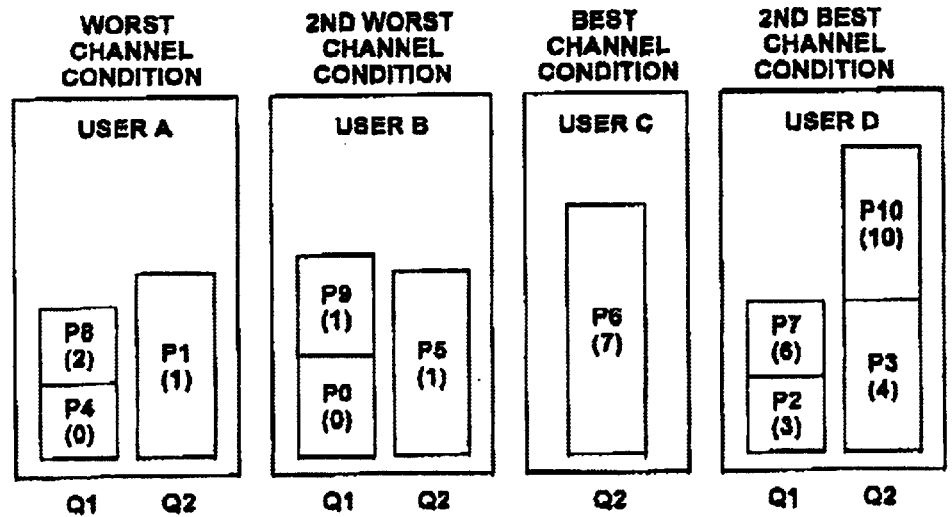
FIG. 5 shows queued packets for four users according to a further example of the method of the present invention.
Figure 6:
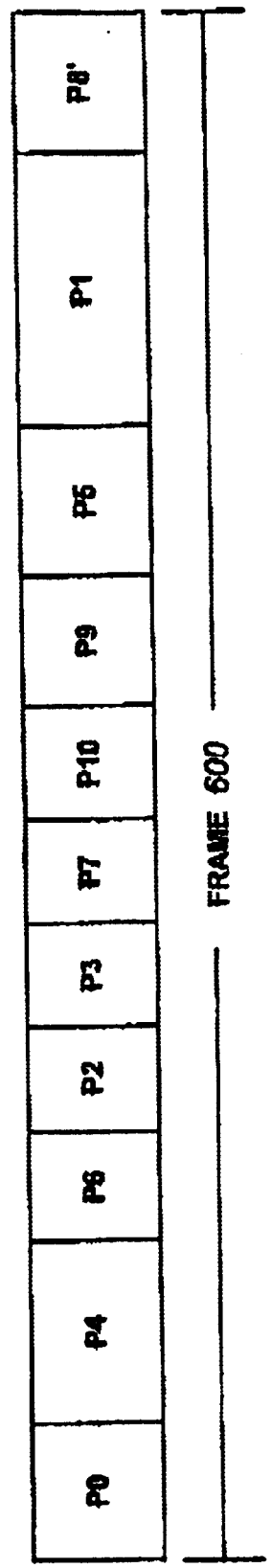
FIG. 6 shows the scheduling of the packets in FIG. 5.

FIGS. 5 and 6 provide an illustration according to this example. As shown in FIG. 5, packets are again queued for Users A, B, C, and D with their per packet QoS indicated in parentheses. User A has the worst reported channel condition, User B has the next worst reported channel condition, User C has the best reported channel condition and User D has the second best reported channel condition.

Both packets P0 and P4 have deadlines of "0". However, User B's channel condition is better than User A's. Therefore, packet P0 is scheduled first in to L2 frame 600, and packet P4 is scheduled next, both at their appropriately calculated link mode. There are no packets remaining with a deadline of zero, therefore the packets for the user with the best channel condition are next selected. Since User C has the best channel condition, User C's packet P6 is next scheduled. User D now has the best channel condition, so User D's packets P2, P3, P7, and P10 are then scheduled. The other packets, packets P9 and P5, belonging to User B are next scheduled. This leaves User A packets P8 and P1. Packet P1 is scheduled first, based on its deadline. There is still some space left in frame 600, but not enough for all of packet P8. Therefore, packet P8 is fragmented and fragment P8' is scheduled for transmission in frame 600. The remaining fragment of packet P8 remains in User A's queue for transmission in a subsequent frame.

As will be apparent to those of skill in the art, numerous variations can be made to the above-described scheduling algorithms. More complex algorithms can result in finer granularity and better use of bandwidth, but may do so at a greater processing cost. The present invention permits a scheduler to perform upper layer traffic scheduling on a per packet basis, taking into account both per packet QoS and real time channel condition. As shown in the examples, the method and system of the present invention enables multiplexing on a per packet basis. It is believed that this can increase system capacity. Link adaptation on a per packet basis is also facilitated. The present invention is particularly applicable to enhanced 3G products such as HDR, and to future mobile and fixed wireless access products.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for scheduling packets for transmission over a forward link in a wireless communication system, comprising:

(i) determining, on a per-packet basis, a wireless quality of service condition for each of a plurality of packets awaiting transmission to a terminal;

(ii) receiving a reported channel condition for a forward link from the terminal;

(iii) determining a link mode for transmission to the terminal according to the reported channel condition; and (iv) scheduling each of the plurality of packets in order of its respective wireless quality of service condition, and at the determined link mode, for transmission in a physical layer frame;

wherein the determination of the wireless quality of service condition includes assigning a packet tag to each of the plurality of packets, the packet tag includes a start time and a finish time, wherein scheduling includes determining a deadline for each of the plurality of packets as a function of their respective start times and a current system time, and wherein the packet tag is defined to be $P_{i,k}$ where i represents the number of queues and k represents number of packets, an arrive time is defined to be $t_{i,k}^{a}$ and is the current system time when the packet enters a queue, the finish time is defined to be $t_{i,k}^{f}$ and is equal to $t_{i,k}^{a}+D$ where D is the packet delay bound, the start time is defined to be $t_{i,k}^{s}$ and is equal to $t_{i,k}^{f}-D_{i,k}^{ret}-D_{i,k}^{frag}$ where $D_{i,k}^{ret}$ is an estimated delay budget for retransmission for packets that can be retransmitted and $D_{i,k}^{frag}$ is the estimated delay budget for fragmentation, and the deadline for each of the plurality of packets is defined to be $t_{i,k}^{d}$ and is equal to the current system time t minus the start time $t_{i,k}^{s}$.

2. A scheduler for scheduling packets for forward link transmission in a wireless communication network, comprising:

a packet tag computation unit for determining, on a per-packet basis, a wireless quality of service condition for each of a plurality of packets awaiting transmission to a terminal;

a link mode determination unit for receiving a reported channel condition for a forward link from the terminal, and for determining a link mode for transmission to the terminal according to the reported channel condition; and a scheduling unit for scheduling each of the plurality of packets in order of its respective wireless quality of service condition, and at the determined link mode, for transmission in a physical layer frame;

wherein the packet tag computation unit determines a start time and a finish time for each of the plurality of packets, the start time and finish being functions of the respective packet delay bound and an arrive time for each of the plurality of packets, the scheduling unit determines a deadline for each of the plurality of packets as a function of its respective start time and a current system time, and wherein the packet tag computation unit determines a packet tag, the packet tag is defined to be $P_{i,k}$ where i represents the number of queues and k represents number of packets, an arrive time is defined to be $t_{i,k}^{a}$ and is the current system time when the packet enters a queue, the finish time is defined to be $t_{i,k}^{f}$ and is equal to $t_{i,k}^{a}+D$ where D is the packet delay bound, the start time is defined to be $t_{i,k}^{s}$ and is equal to $t_{i,k}^{f}-D_{i,k}^{ret}-D_{i,k}^{frag}$ where $D_{i,k}^{ret}$ is an estimated delay budget for retransmission for packets that can be retransmitted and $D_{i,k}^{frag}$ is the estimated delay budget for fragmentation, and the deadline for each of the plurality of packets is defined to be $t_{i,k}^{d}$ and is equal to the current system time t minus the start time $t_{i,k}^{s}$.

* * * * *